(12) United States Patent
Coon

(10) Patent No.: US 6,424,497 B1
(45) Date of Patent: Jul. 23, 2002

(54) SUSPENSION LOAD BEAM MOUNTING SYSTEM

(75) Inventor: Warren Coon, Temecula, CA (US)

(73) Assignee: Magnecomp-Corp, Temecula, CA (US)

( * ) Notice: Subject to any disclaimer, the term of this patent is extended or adjusted under 35 U.S.C. 154(b) by 0 days.

(21) Appl. No.: 09/130,247

(22) Filed: Aug. 6, 1998

Related U.S. Application Data

(60) Provisional application No. 60/055,123, filed on Aug. 7, 1997.

(51) Int. Cl.⁷ .............................. G11B 5/48; G11B 21/16
(52) U.S. Cl. ................................................... 360/244.6
(58) Field of Search .............................. 360/104, 244.6

(56) References Cited

U.S. PATENT DOCUMENTS

| | | | |
|---|---|---|---|
| 4,829,395 A | | 5/1989 | Coon et al. ................. 360/104 |
| 5,012,367 A | * | 4/1991 | Toensing .................... 360/104 |
| 5,153,794 A | * | 10/1992 | Hinlein ...................... 360/104 |
| 5,185,683 A | * | 2/1993 | Oberg et al. ................ 360/104 |
| 5,187,626 A | | 2/1993 | Hopkins et al. ............ 360/104 |
| 5,689,389 A | | 11/1997 | Braunheim ................. 360/104 |
| 5,812,343 A | * | 9/1998 | Budde et al. ............... 360/104 |

* cited by examiner

Primary Examiner—William Klimowicz
(74) Attorney, Agent, or Firm—Louis J. Bachand

(57) ABSTRACT

A disk drive suspension mounting system is provided in which staking of the mounting plate to an actuator arm does not distort the mounting plate flange or impinge on gram loading values of the load beam, by increasing the diameter of the bore to from 95% to 99% of the flange opening, decreasing the diameter of the flange opening to slip fit the staking ball, and lengthening the bore so as to maintain displaced mass and torque values.

12 Claims, 3 Drawing Sheets

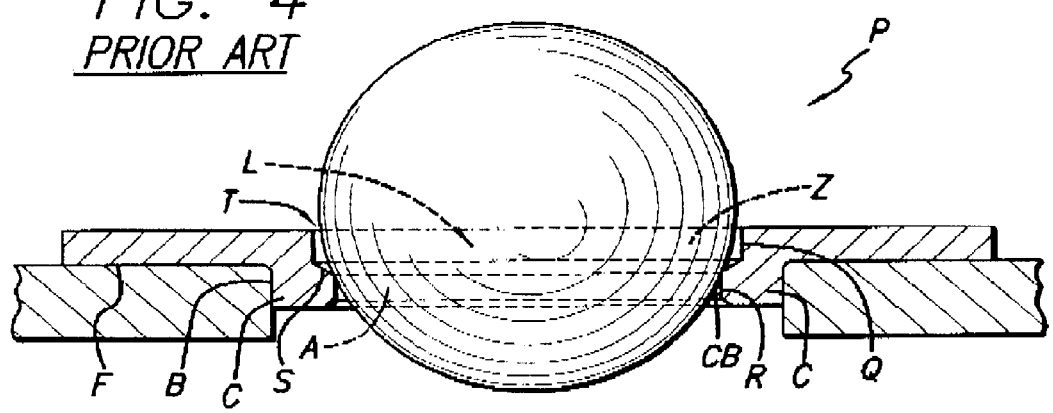
FIG. 4
PRIOR ART
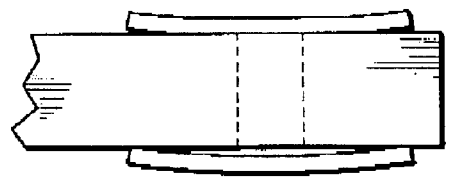
FIG. 5
PRIOR ART
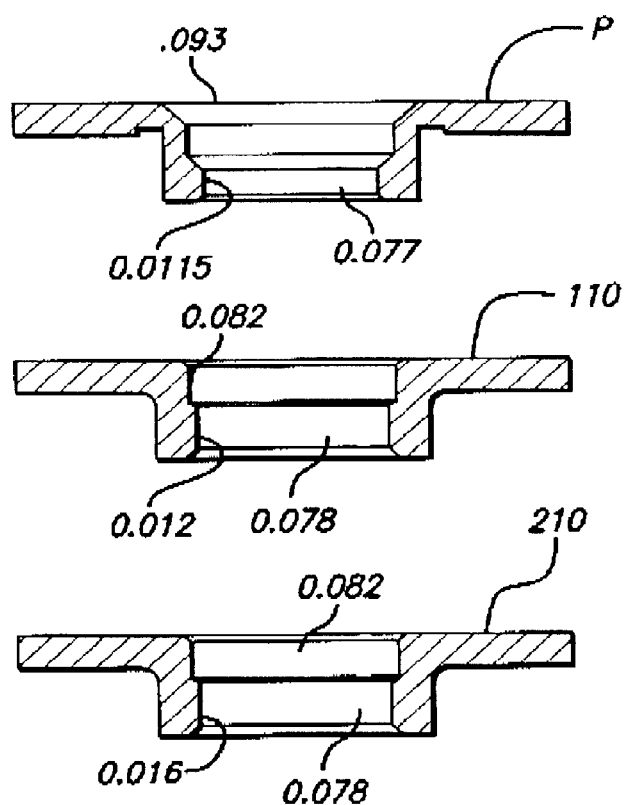
FIG. 7
PRIOR ART
FIG. 8
FIG. 9

SUSPENSION LOAD BEAM MOUNTING SYSTEM

REFERENCE TO RELATED APPLICATION

This application claims the benefit of U.S. Provisional Application Ser. No. 60/055,123, filed Aug. 7, 1997.

BACKGROUND OF THE INVENTION

1. Field of the Invention

This invention has to do with disk drive suspensions, and more particularly with improvements in the mounting of load beams to actuator arms in the production of disk drive suspensions and head stack assemblies of such suspensions.

2. Related Art

Workers in the art have designed novel mounting plates for specific purposes. See U.S. Pat. No. 4,829,395 to Coon et al, and U.S. Pat. No. 5,187,626 to Hopkins et al. In U.S. Pat. No. 5,689,389 to Braunhelm a low profile mounting plate is disclosed having as a critical feature a ratio of the mounting plate bore diameter being at least 85% of the mounting plate flange opening diameter. The Braunhelm device is illustrated in FIG. 4 of the attached drawings. It will be noted that Braunheim teaches a mounting plate P having a planar flange F and an annular boss B with a center bore CB having a opening R surrounded by a wall C. Bore CB has a very substantial shoulder S marking the transition from flange opening Q to the bore CB. The bore wall C is deflected into the surrounding actuator arm AA staking hole H by driving the staking ball L through the bore. Braunhelm's teaching of an 85% ratio of boss bore CB to flange opening Q leaves the shoulder S to be engaged by the staking ball L in a manner that imparts large axial forces on the mounting plate P. In fact only radial forces are desired, not axial forces since axial forces tend to bend the flange F from its intended planarity causing changes in gram force loads exerted by the load beam LB held between the flange F and the actuator arm AA. Moreover, the effect tends to vary with the direction of the axial force. The compression force direction (shown in FIG. 5) produces a small significant loss in gram load but typically considerably less than the loss effected from a tension force resultant from driving the ball L in the opposite the direction of the illustration in FIG. 5. Since the typical actuator arm has an upper and lower suspension, there is no choice but to drive the staking ball in both compression and tension in swaging two mounting plates on a common actuator arm. The ratio of boss bore to flange opening taught by Braunhelm at 85% is far too low. While Braunhelm places no upper limit on this ratio it is evident that he contemplates maintaining a substantial shoulder S, and this dictates a ratio of about 85% and certainly not as much as 90%.

SUMMARY OF THE INVENTION

The present invention seeks to substantially eliminate the shoulder between the flange opening and the boss bore, and to make other improvements in the design of a mounting plate. To do so, the invention increases the boss bore diameter to a value ensuring radial engagement forces upon staking, but minimizing axial engagement forces. In addition the flange opening is minimized to just a slip fit clearance for the staking ball or tool. This ensures the correct path for the staking ball into the boss bore. The arrangement further permits the staking fixture to support the flange closer to the boss bore, assisting in maintaining the flange uncrowned up or down by axial forces on the boss.

As mentioned, a source of unpredictable performance deviation in disk drive suspensions is the sometime discrepancy introduced by changes in the gram load exerted by the load beam as a result of distortion of the mounting plate occurring as the mounting plate carrying the load beam is staked to the actuator. The mounting plate has a substantially planar, flat flange portion and normal thereto a boss portion comprising an annular wall centered on a small diameter bore. The suspension load beam is affixed to the plate flange portion; the suspension actuator is engaged with the plate bore portion within the actuator staking hole by the staking operation. In the staking operation, a staking tool, such as a staking ball, is forced through the bore of the mounting plate boss portion to force the boss portion to engage the surrounding wall of the actuator staking hole. Uniformity of result is not always realized even with standardized operation. Among the most vexing deviations from the norm are the dissimilar changes in gram loading from an intended standard to some other value, different for the load beam on one side of the actuator arm from those for the load beam on the other side of the load beam. These variations divergent changes vary with the direction of the staking ball through the mounting plate bore. Since it is not predictable in which direction it will be necessary to drive the staking tool, unpredictable effects visit suspension assembly construction, lowering yield, increasing costs, and preventing the obtaining of maximum performance consistently.

The invention utilizes an improved mounting plate structure to minimize variations in the load beam gram load values in the produced suspensions. The invention makes more uniform and more predictable the effects on gram load of staking the mounting plate and its load beam to the actuator arm. Suspensions having upper and lower load beams on a common actuator arm are typically staked with a common staking tool traveling in a single up or down direction. Staked suspensions have been prone to variations in gram load changes in the upper and lower suspensions dependent on the direction of the staking tool; these variations are minimized by the invention mounting system. The new mounting plate structure features a novel boss bore design of relatively increased diameter to have a smaller radial displacement and thus less resistance to axial travel of the staking tool. Additionally the invention greatly reduces the flange opening leading to the boss bore e.g. to a slip fit size relative to the staking tool, to lessen the size difference between the flange opening and the boss bore. The combination of increased bore size and reduced flange opening size substantially eliminates the annular shoulder between the flange opening and the boss bore. The substantial absence of this annular shoulder reduces the axial impact when the staking tool is driven through the mounting plate, as there is less physical obstruction projecting radially in the path of the staking tool, while the boss bore remains slightly undersized for tool passage so that the bore wall is deflected radially outward into actuator arm engagement. The minimally differentiated (from the flange opening) boss bore diameter is maintained substantially uniform throughout the length of the mounting plate bore, the bore length being increased as necessary to provide useful level of static force between the actuator arm staking hole and the mounting plate boss portion to control the load beam during movement of the actuator arm. The reduced flange opening enables closer support of the mounting plate flange by the staking fixture during staking and this too blocks unwanted distortion of the plate flange and limits further unwanted gram load changes in the suspension from the staking operation, particularly gram load variations between upper and lower suspensions on a common actuator arm.

Study of the results of many staking operations, in either direction, reveals that the mounting plate flange is distorted by an axial shift of the mounting plate boss toward or away from the mounting plate flange depending on the direction of the staking tool. This axial shift is an unwanted addition to the radial displacement of the bore wall being sought, but appears necessary if adequate force of engagement between the actuator hole wall and the mounting plate boss, e.g., an engagement force at a minimum, expressed as static locking torque, of 4–5 inch ounces of torque, is to be obtained.

It is accordingly an object of the invention to provide a novel disk drive suspension, and more particularly a disk drive suspension mounting plate which offers the requisite static locking torque for successfully engaging the actuator while carrying the load beam of the disk drive suspension, but avoids unwanted axial shifting causing distortion of the plate flange from its planarity. A further object is to modify the design of known mounting plates to avoid features therein causing or increasing the plate flange distortion. Yet another object is to provide an improved disk drive suspension mounting plate which is bi-directional, that is staking in either direction is uniform in result, eliminating the directionally sensitive response of previously known mounting plates. A further object is to provide a mounting plate which retains substantially a flat, planar flange after staking to an actuator. Other objects include maintaining the boss bore at at least 95% and up to 99% and higher of the flange opening. Other objects will appear hereinafter.

These and other objects of the invention to become apparent hereinafter are realized in a substantially staking distortion-free disk drive suspension load beam-to-actuator mounting plate, the mounting plate comprising a generally planar flange portion for attachment to a load beam, and extending normal thereto a boss portion adapted for engagement with an actuator by displacement thereof by a staking tool of predetermined diameter into a staking hole defined by the actuator, the staking tool and boss portion being relatively sized such that the boss portion is displaced radially into actuator staking hole engagement without being displaced axially sufficiently to distort the flatness of the mounting plate flange, e.g., the bore in the boss portion being at least 95% of the flange portion opening.

In a further embodiment the invention provides a substantially staking distortion-free disk drive suspension load beam-to-actuator mounting plate, the mounting plate comprising a generally planar flange portion for attachment to a load beam, and extending normal thereto a boss portion adapted for engagement with an actuator by displacement thereof into a staking hole defined by the actuator, the boss portion being displaceable by a staking tool of predetermined diameter, the boss portion comprising a radially displaceable annular mass centered on an axial bore through which the staking tool passes in either direction, the boss portion annular mass being so constructed and arranged that it is entirely radially displaced into actuator staking hole engagement without any portion of the mass being axially displaced a distance from its initial position by passage through the axial bore of the staking tool which to resist axial passage of the staking tool sufficiently to distort the mounting plate flange portion from its generally planar condition.

In this and like embodiments, typically, the mounting plate flange is flat, the staking tool has a diameter from 0.080 to 0.083 inch, and the annular mass is radially displaced a maximum distance of 0.001 to 0.003 inch in proportion to increasing the staking tool diameter and to allow passage of the staking tool without distorting the mounting plate from its flatness.

In a further embodiment, the invention provides a substantially staking distortion-free disk drive suspension load beam-to-actuator mounting plate, the mounting plate comprising a generally planar flange portion for attachment to a load beam, and extending normal thereto a boss portion adapted for engagement with an actuator by displacement thereof into a staking hole defined by the actuator, the boss portion being displaceable by a staking tool of predetermined diameter, the boss portion comprising a radially displaceable annular mass centered on an axial bore through which the staking tool passes in either direction, the boss portion annular mass being so constructed and arranged that it is entirely radially displaced into actuator staking hole engagement without any portion of the mass being radially displaced more than 0.0015 inch from its initial position by passage through the axial bore of the staking tool, whereby axial resistance to staking tool passage is reduced and concomitant mounting plate distortion substantially eliminated.

In this and like embodiments, typically, the annular mass surrounds a bore having an initial diameter of 0.078 inch, the staking tool diameter being 0.081 inch, the mass being radially displaced by the tool a maximum distance of 0.0015 inch; the annular mass has a substantially uniform wall thickness for the length of the axial bore; the axial bore has a constant diameter; the annular mass has a substantially uniform wall thickness for the length of the axial bore; the mounting plate further includes an annular shoulder having an axial extent coaxial with the axial bore, the annular shoulder defining a transition from the axial bore of the boss portion to the mounting plate flange portion, the annular shoulder having a diameter greater than the axial bore diameter and such that the staking tool slip fits within the annular shoulder for the length of its the axial extent; the annular shoulder has a diameter 0.001 inch greater than the axial bore; the bore diameter is from 95 to 99% of the diameter of the flange opening, the diameter of the annular shoulder is constant throughout the axial extent of the annular shoulder, and the flange portion has a constant thickness outward from the boss portion of the mounting plate, i.e. is free of thickness-reducing cuts at or near the boss.

In yet another embodiment, the invention provides a substantially staking distortion-free disk drive suspension load beam-to-actuator mounting plate, the mounting plate comprising a generally planar flange portion for attachment to a load beam, and extending normal thereto a boss portion adapted for engagement with an actuator by displacement thereof into a staking hole defined by the actuator, the boss portion being displaceable by a staking tool of predetermined diameter, the boss portion comprising a radially displaceable annular mass centered on an axial bore and having a substantially uniform wall thickness for the length of the bore, the staking tool passing in either direction through the axial bore, the boss portion annular mass being so constructed and arranged that it is entirely radially displaced into actuator staking hole engagement without any portion of the mass being radially displaced more than 0.0015 inch from its initial position by passage through the axial bore of the staking tool, whereby axial resistance to staking tool passage is reduced and concomitant mounting plate distortion substantially eliminated.

In this and like embodiments, typically, the axial bore has a constant diameter, the mounting plate also includes an annular shoulder having an axial extent coaxial with the axial bore, the annular shoulder defining a transition from the axial bore of the boss portion to the mounting plate flange portion, the annular shoulder having a diameter greater than the axial bore diameter and such that the staking tool slip fits within the annular shoulder for the length of its the axial extent; the annular shoulder has a diameter about 0.001 inch greater than the axial bore; the diameter of the annular shoulder is constant throughout the axial extent of the annular shoulder; and, the annular mass surrounds a bore having an initial diameter of 0.078 inch, the staking tool diameter being 0.081 inch, the mass being radially displaced by the tool a maximum distance of 0.0015 inch.

In a still further embodiment, there is provided a disk drive suspension mounting plate for attaching a load beam to an actuator the mounting plate comprising a generally planar flange portion attachable to a load beam, and an annular boss portion engageable with an actuator by displacement thereof into a surrounding staking hole defined by the actuator, the boss portion having a substantially constant wall thickness and a substantially constant diameter bore to be free of localized areas of reduced bore dimension, whereby passage of a staking tool axially within the boss portion bore radially displaces all areas of the boss portion substantially the same without a localized increase in resistance to staking tool axial passage.

In a further embodiment, the invention provides a substantially staking distortion-free disk drive suspension comprising an actuator, a load beam, a flexure and a slider carried by the load beam for reading a disk, and a load beam-to-actuator mounting plate, the mounting plate comprising a generally planar flange portion for attachment to a load beam, and extending normal thereto a boss portion adapted for engagement with an actuator by displacement thereof into a staking hole defined by the actuator, the boss portion being displaceable by a staking tool of predetermined diameter, the boss portion comprising a radially displaceable annular mass centered on an axial bore through which the staking tool passes in either direction, the boss portion annular mass being so constructed and arranged that it is entirely radially displaced into actuator staking hole engagement without any portion of the mass being radially displaced more than 0.0015 inch from its initial position by passage through the axial bore of the staking tool, whereby axial resistance to staking tool passage is reduced and concomitant mounting plate distortion substantially eliminated.

The invention further contemplates in combination: The invention mounting plate and a load beam and actuator.

In a further aspect the invention provides a disk drive suspension comprising a load beam, an actuator for the load beam, and the invention mounting plate attaching the load beam to the actuator.

In its method aspects, the invention contemplates a method of mounting a load beam to an actuator having a staking hole, including attaching a load beam to a planar flange portion of a mounting plate, positioning an annular boss portion of the mounting plate within the actuator staking hole, and displacing with a staking tool the annular boss portion radially and not axially sufficiently to engage the actuator staking hole with the boss portion and without axially shifting the boss portion relative to the flange portion so as to distort the flange portion from its planarity.

BRIEF DESCRIPTION OF THE DRAWINGS

The invention will be further described in conjunction with the attached drawings in which:

FIG. 4 is a view of a prior art mounting plate;

FIG. 5 is a schematic depiction of distorted mounting plates showing the modes of distortion;

FIG. 7 is a view in longitudinal section of a prior art mounting plate;

FIG. 8 is a view like FIG. 7 of an invention mounting plate; and,

FIG. 9 is a view like FIG. 7 of a second invention mounting plate.

DETAILED DESCRIPTION OF THE INVENTION

Figure 1:
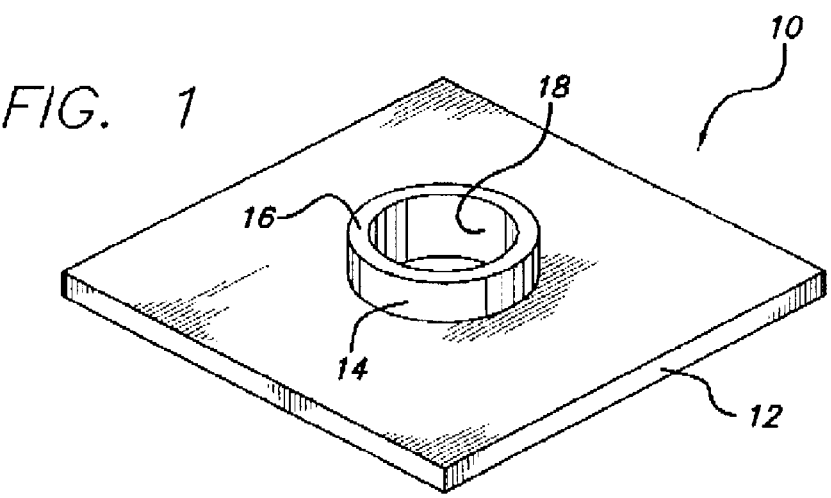
FIG. 1 is an axonometric view of the invention mounting plate.

Virtually all disk drive suspensions have an actuator that holds the head gimbal assemblies (HGAs) in proper position over the disk. Typically the HGAs are mounted such that the top and bottom surface of the disk or disks can be accessed simultaneously. This means that one HGA is installed up-facing and one is down-facing, in the case of a two head stack, or there may be any number of heads in a stack. Sometimes there may be as many as 16 heads (8 up, 8 down).

When the actuator is built, the HGAs are loosely held in place by a fixture (the staking fixture) until the staking tool or ball is driven through the actuator assembly.

When this is complete the assembly is removed from the fixture and becomes an HSA (Head Stack Assembly).

The slider (the term is "head" but this is sometimes used to mean the slider and sometimes used to mean the HGA) may have UP and DOWN versions to match the up and down versions of the suspension. This is done usually as a mirror image to maximize utilization of disk space. Other than being usually mirror images of one another, the UP and DOWN suspensions are the same. The mounting plate is almost always the same part number (identical) for UP and DOWN configurations. Compare the mounting plate arrangement shown in U.S. Pat. No. 5,187,626.

During staking, sometimes called swaging, a hardened steel ball is driven through the actuator, as it and the HGAs are mounted on the fixture, in such a way that the ball OD is greater than the ID of the boss of the suspension. This is described in U.S. Pat. No. 4,829,395. The boss ID expands to form an interference fit with the corresponding hole in the actuator and the suspension is locked in place onto the actuator.

Since the mounting plate is the same for UP and DOWN suspensions, it would be ideally able to perform the same no matter which way the ball goes through. That is, when the ball is passed through the boss from the actuator side of the assembly (the DOWN case) it should give the same result as if the ball were passed through from the mounting plate side (the UP case). This is almost never the case in practice however. There is usually a change in gram load applied by the suspension to the slider, and there is usually a difference between the change for the UP case compared to the change for the DOWN case. Typically, the DOWN HGA experiences a reduction in the load force it is able to apply to the slider of the order of 0.2 grams to 0.4 grams, while the UP HGA experiences a increase of 0.0 grams (no change) to 0.2 grams. These results are what engineers in the industry are able to achieve with everything optimized and working correctly (good fixture design and equipment and operator not making mistakes). This difference in gram load applied force translates to a variation in flying height of the slider and thus to electrical performance and yield in the disk drive final product. The amount of the difference between UP and DOWN cases final performance depends on the sensitivity of the slider air bearing (air bearing stiffness), magnetic element design, and other factors but in all cases the variation in gram load results in variation in the final product and it is desirable to reduce variation in order to improve quality and cost. Various strategies have been developed to deal with the gram load variation due to staking, including (1) adjusting the target gram load of the suspension as it is before staking to compensate for the anticipated reduction, (2) adjusting the gram force after the staking operation, and (3) accepting the reduced performance available when the rest of the disk drive is designed to use the worst case result of a wider variation. The problem with the first two solutions is that the other parameters of the suspension/slider combination may be inadvertently misadjusted without anyone having the means to easily detect and screen. For example, the mechanical frequency response characteristics of the suspensions are known to change (for the worse, since it has been optimized in its present form) by adjusting the gram load after it has been built correctly. This is a disadvantage of the first two strategies. The disadvantage of the third strategy is that the designer achieves less performance than he would have otherwise.

Figure 6:
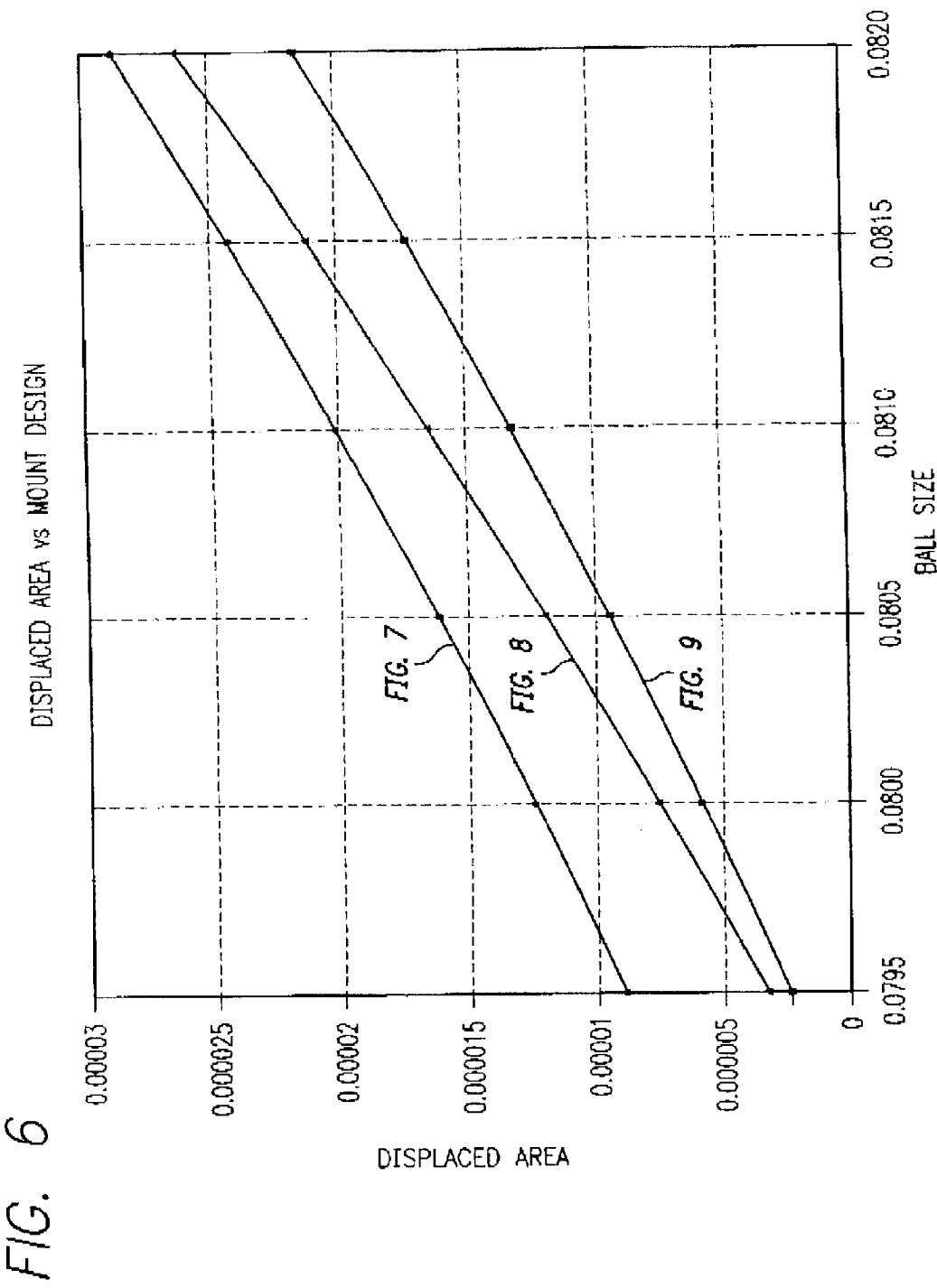
FIG. 6 is a graphical depiction of the comparability in displacement of the invention mounting plates and the prior art mounting plate.

The present invention involves improving the design of the mounting plate so that the deformation of the plate is more similar between the UP and DOWN cases. This is an attempt to maximize the radial force applied to the actuator arm while reducing the axial force required to push the ball through. The axial force tends to distort the mounting plate flat area ("flange") without adding to the attachment functionality. The invention reduces the amount of material that must be moved radially by the ball as it passes through the mounting plate bore ID by increasing that ID. The total displacement remains the same, however, and the locking or anti-torque force is maintained by increasing the length of the land or smallest part of the ID, suitably in proportion to the reduction in ID. This is shown in FIG. 6

It is believed that the change in gram load is caused by deformation of the flange. It is known that the flange is deformed during staking. In extreme cases, e.g. deliberately using an oversize staking ball, you can see that the upward facing head position (which has the ball applied from the plate side) tends to dish concave upward, while the down facing head (with the ball applied from the actuator side) tends to dish convex downward. See FIG. 5.

Figure 2:
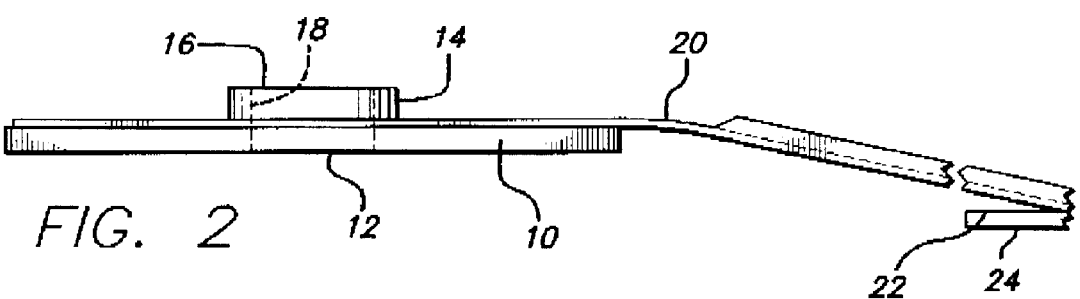
FIG. 2 is a side elevation thereof, assembled with a load beam, flexure and slider.

With reference now to the drawings in detail, in FIGS. 1 and 2 the invention mounting plate is depicted at 10 and comprises a planar, flat flange portion 12 and normal thereto a boss 14 comprising an annular wall 16 centered around an axial bore 18. Load beam 20 carrying a flexure 22 and slider 24 is fixed, as by spot welds, to the flange portion 12 of the mounting plate 10.

Figure 3:
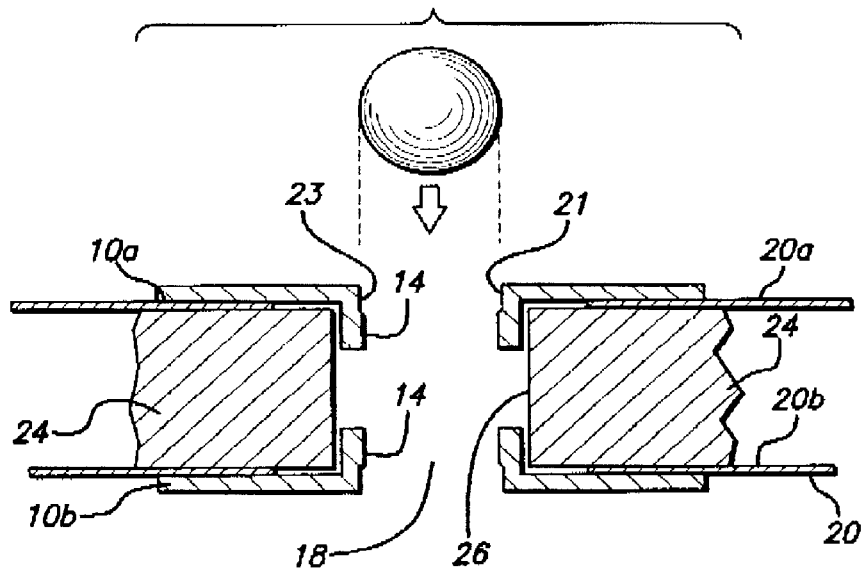
FIG. 3 is a view in vertical section of the invention mounting plates in opposed relation to support stacked load beams in attachment to an actuator arm.

The mounting of the load beam 20 to the actuator arm 24 is shown in FIG. 3. There mounting plate 10a, the upper mounting plate is inserted by its boss portion 14 into the staking hole 26 in the actuator arm 24. Lower mounting plate 10b is inserted similarly but from the bottom to stack the upper and lower load beams 20a, 20b. The difference in the diameter of the diameter of the axial bore 18 and the flange opening 21 is such that there is a minimal shoulder 23 at the transition between the opening and bore, preferably 0.001 inch. The shoulder 23 is reduced in size relative to the prior art, See FIG. 4, by having the flange opening smaller than usual, just large enough to slip fit the staking tool.

With reference to FIGS. 7, 8 and 9, the prior art (FIG. 7) and the invention (FIGS. 8 and 9) mounting plates are shown. It will be noted that the invention mounting plates 110 and 210 have a boss bore before swaging diameter of 0.078 inch, rather than 0.077 inch in the FIG. 7 mounting plate P. Assuming a common staking ball size of 0.081 inch, the difference of 0.001 inch translates to less axial force in the course of the ball passage through the bore. Less axial force translates to less shifting of the mounting plate bore toward the mounting plate flange, less force acting on the center of the mounting plate flange, and less tendency to distort the flange from its flatness and planarity.

The Braunhelm prior art mounting plate P shown in FIG. 4 has is a wide throat T leading into boss B from the top of flange portion F which leads to a reduced diameter zone Z and finally to the axial bore A proper in which the staking ball L swages the mounting plate to the surrounding actuator arm AA. The displaceable mass of the prior art mounting plate P is concentrated in the area C rather than distributed more vertically. Typically, the area C has a bore of 0.077 inch. The typical final staking ball is 0.081 inch, meaning there is a diametrical displacement of not less than 0.004 inch by the staking ball (including a common first staking ball having a diameter of 0.079 inch. I have found that such a great displacement over so short a length produces distortions of the mounting plate P like those shown in FIG. 5.).

The effectiveness of the mounting plate in mounting the load beam to the actuator is a function of the engagement force, or minimum static locking torque, achieved between the mounting plate boss and the actuator staking hole wall. This force is a function of the amount of displacement of the boss annular wall. In FIG. 6 a typical displacement profile is shown for the prior art mounting plate, in comparison with the invention mounting plates. At any given staking ball size, the total displacement of the boss portion achieved by the invention compares favorably with the prior art and like static locking torque values are accordingly realized, despite changes in the profile of the mounting plate boss portion annular wall to obtain a flange-distortion free swaging by the staking ball.

I claim:

1. A mounting plate for the substantially staking distortion-free attachment of a load beam to an actuator in a disk drive suspension, said actuator having a staking hole, said mounting plate comprising a generally planar flange portion for attachment to a load beam, said flange portion defining one of side a flange opening having a predetermined diameter, and on the other side extending normal to the planar flange portion a boss portion having a boss bore with a diameter from 95% to 99% of said flange opening predetermined diameter, said boss portion being adapted for engagement with said actuator by staking tool displacement thereof into actuator staking hole engagement a maximum radial distance of 0.0015 inch without being displaced axially sufficiently to distort the flatness of said mounting plate flange portion.

2. The mounting plate according to claim 1, in which said mounting plate flange is flat, said staking tool has a diameter from 0.080 to 0.083 inch, and said annular mass is radially displaced a maximum distance of 0.0015 inch in proportion to increasing said staking tool diameter and to allow passage of said staking tool without distorting said mounting plate from its flatness.

3. In combination: The mounting plate of claim 1 and a load beam and actuator.

4. A disk drive suspension comprising a load beam, an actuator for said load beam, and the mounting plate of claim 1 attaching said load beam to said actuator.

5. A substantially staking distortion-free disk drive suspension load beam-to-actuator mounting plate, said mounting plate comprising a straight-sided, rectangular, generally planar flange portion for attachment to a load beam and having a flange opening of a predetermined diameter, and extending normal thereto a boss portion adapted for engagement with an actuator by displacement thereof into a staking hole defined by said actuator, said boss portion being displaceable by a staking tool of predetermined diameter, said boss portion comprising a radially displaceable annular mass centered on an axial bore having a diameter from about 95% to about 99% of said flange opening diameter through which said staking tool passes in either direction, said boss portion annular mass being so constructed and arranged that it is entirely radially displaced into actuator staking hole engagement without any portion of said mass being radially displaced more than 0.0015 inch from its initial position by passage through said axial bore of said staking tool, whereby axial resistance to staking tool passage is reduced and concomitant mounting plate distortion substantially eliminated.

6. The mounting plate according to claim 5, in which said annular mass surrounds an axial bore having an initial diameter of 0.078 inch, said staking tool diameter being 0.081 inch, whereby said mass is radially displaced by said tool a maximum distance of 0.0015 inch.

7. The mounting plate according to claim 5, in which said annular mass has a substantially uniform wall thickness for the length of said axial bore.

8. The mounting plate according to claim 5, in which said axial bore has a constant diameter.

9. The mounting plate according to claim 8, in which said annular mass has a substantially uniform wall thickness for the length of said axial bore.

10. The mounting plate according to claim 5, including also an annular shoulder having an axial extent coaxial with said axial bore, said annular shoulder defining a transition from said axial bore of said boss portion to said mounting plate flange portion, said annular shoulder having a diameter about 0.001 inch greater than said axial bore diameter and such that said staking tool slip fits within said annular shoulder for the length of its axial extent.

11. The mounting plate according to claim 10, in which the diameter of said annular shoulder is constant throughout the axial extent of said annular shoulder, said flange portion having a constant thickness outward from said boss portion of said mounting plate.

12. The method of mounting a load beam to an actuator having a staking hole, including attaching a load beam to a generally planar flange portion of a mounting plate, said flange portion having a flange opening of a predetermined diameter, positioning an annular boss portion of the mounting plate within the actuator staking hole, said boss having a bore having a diameter from 95% to 99% of said flange opening predetermined diameter, and displacing with a staking tool said annular boss portion radially, and not axially, sufficiently to engage the actuator staking hole with said boss portion, said boss being radially displaced by said tool a maximum distance of 0.0015 inch, and without axially shifting said boss portion relative to said flange portion so as to distort said flange portion from its planarity.

* * * * *